(12) United States Patent
Walsh

(10) Patent No.: US 10,402,754 B1
(45) Date of Patent: *Sep. 3, 2019

(54) SYSTEM AND METHOD FOR TESTING AIRLINE REVENUE OPTIMIZATION AND RELATED TOOLS OR PRODUCTS FOR TRAVEL

(71) Applicant: DATALEX (IRELAND) LIMITED, Dublin (IE)

(72) Inventor: Donal Walsh, Dublin (IE)

(73) Assignee: Datalex (Ireland) Limited, Dublin (IE)

( * ) Notice: Subject to any disclaimer, the term of this patent is extended or adjusted under 35 U.S.C. 154(b) by 131 days.

This patent is subject to a terminal disclaimer.

(21) Appl. No.: 15/403,959

(22) Filed: Jan. 11, 2017

Related U.S. Application Data

(63) Continuation of application No. 13/495,348, filed on Jun. 13, 2012, now Pat. No. 9,595,042.

(60) Provisional application No. 61/531,943, filed on Sep. 7, 2011, provisional application No. 61/531,932, filed on Sep. 7, 2011.

(51) Int. Cl.
*G06Q 10/02* (2012.01)
*H04L 29/08* (2006.01)
*H04L 12/24* (2006.01)

(52) U.S. Cl.
CPC ....... *G06Q 10/025* (2013.01); *H04L 41/5038* (2013.01); *H04L 41/5061* (2013.01); *H04L 67/02* (2013.01); *H04L 67/10* (2013.01); *H04L 67/2842* (2013.01)

(58) Field of Classification Search
CPC ................ G06Q 10/00; G06Q 50/00
USPC ............................. 705/7.11–7.42
See application file for complete search history.

(56) References Cited

U.S. PATENT DOCUMENTS

| | | | |
|---|---|---|---|
| 6,076,108 | A | 6/2000 | Courts et al. |
| 6,085,220 | A | 7/2000 | Courts et al. |
| 6,307,572 | B1 | 10/2001 | DeMarcken et al. |
| 6,360,249 | B1 | 3/2002 | Courts et al. |
| 6,476,718 | B1 | 11/2002 | Mutlow et al. |
| 6,477,520 | B1 | 11/2002 | Malaviya et al. |
| 6,480,894 | B1 | 11/2002 | Courts et al. |
| 7,058,590 | B2 | 6/2006 | Shan |
| 7,231,606 | B2 * | 6/2007 | Miller ................ H04L 43/50 702/186 |

(Continued)

OTHER PUBLICATIONS

U.S. Appl. No. 61/375,617, filed Aug. 20, 2010, Confirmation No. 1200.

(Continued)

*Primary Examiner* — Alan S Miller
(74) *Attorney, Agent, or Firm* — Amster, Rothstein & Ebenstein LLP

(57) ABSTRACT

Systems and methods are provided for testing and measuring user interactions with respect to one or more changes introduced into a travel distribution platform. A testing module associated with the travel distribution platform can receive client request data and transmit to one or more engines or services of travel distribution platform, instructions and/or code such that the travel distribution platform provides a modified response to the client request data. The testing module can measure the effect and impact of the modified response across a plurality of variables by monitoring subsequent interactions with respect to the travel distribution platform.

20 Claims, 17 Drawing Sheets

(56) References Cited

U.S. PATENT DOCUMENTS

| | | | | |
|---|---|---|---|---|
| 7,302,399 | B1* | 11/2007 | Donovan | G06Q 10/02 705/5 |
| 7,349,894 | B2 | 3/2008 | Barth et al. | |
| 7,499,864 | B2 | 3/2009 | Campbell et al. | |
| 7,711,587 | B2 | 5/2010 | De Marcken | |
| 7,769,610 | B2 | 8/2010 | Liew et al. | |
| 7,831,658 | B2* | 11/2010 | Khopkar | G06Q 30/02 709/203 |
| 7,844,894 | B2* | 11/2010 | Khopkar | G06F 17/212 715/234 |
| 8,600,805 | B2* | 12/2013 | Wallace | G06Q 10/02 705/14.23 |
| 8,627,288 | B2 | 1/2014 | Kimball et al. | |
| 8,762,184 | B2* | 6/2014 | Rayner | G06Q 10/025 705/5 |
| 8,775,603 | B2 | 7/2014 | Hansen | |
| 9,201,770 | B1* | 12/2015 | Duerk | G06F 11/3438 |
| 9,292,615 | B2* | 3/2016 | Seifert | G06F 16/958 |
| 2002/0010668 | A1* | 1/2002 | Travis | G06Q 30/02 705/35 |
| 2002/0072937 | A1* | 6/2002 | Domenick | G06Q 10/02 705/5 |
| 2003/0078835 | A1 | 4/2003 | Pluchinske | |
| 2003/0163375 | A1 | 8/2003 | Dombrowski | |
| 2004/0060057 | A1 | 3/2004 | Hansen et al. | |
| 2004/0078213 | A1 | 4/2004 | Brice et al. | |
| 2004/0117239 | A1 | 6/2004 | Mittal et al. | |
| 2004/0193457 | A1* | 9/2004 | Shogren | G06Q 10/02 705/5 |
| 2004/0254819 | A1 | 12/2004 | Halim et al. | |
| 2005/0021424 | A1 | 1/2005 | Lewis | |
| 2006/0162071 | A1* | 7/2006 | Dixon | G06Q 30/02 5/93.1 |
| 2006/0271671 | A1* | 11/2006 | Hansen | G06Q 30/02 709/224 |
| 2006/0287916 | A1 | 12/2006 | Starr | |
| 2007/0022003 | A1* | 1/2007 | Chao | G06Q 30/02 705/14.46 |
| 2007/0100962 | A1 | 5/2007 | Barth et al. | |
| 2007/0260495 | A1* | 11/2007 | Mace | G06Q 10/02 705/5 |
| 2008/0010104 | A1 | 1/2008 | Williamson et al. | |
| 2008/0046298 | A1* | 2/2008 | Ben-Yehuda | G06Q 10/025 705/6 |
| 2008/0166995 | A1 | 7/2008 | Sun | |
| 2008/0167887 | A1 | 7/2008 | Marcken | |
| 2008/0168093 | A1 | 7/2008 | De Marcken | |
| 2008/0198761 | A1* | 8/2008 | Murawski | G06Q 10/02 370/254 |
| 2008/0275980 | A1 | 11/2008 | Hansen | |
| 2009/0282343 | A1* | 11/2009 | Catlin | G06Q 30/02 715/738 |
| 2010/0064281 | A1 | 3/2010 | Kimball et al. | |
| 2010/0138452 | A1 | 6/2010 | Henkin et al. | |
| 2010/0198628 | A1 | 8/2010 | Rayner | |
| 2010/0312713 | A1 | 12/2010 | Keltner | |
| 2011/0004497 | A1 | 1/2011 | Mortimore et al. | |
| 2012/0290920 | A1* | 11/2012 | Crossley | G06F 11/3664 715/234 |
| 2013/0138503 | A1* | 5/2013 | Brown | G06Q 30/0246 705/14.45 |
| 2014/0114842 | A1 | 4/2014 | Blackhurst | |
| 2014/0304056 | A1 | 10/2014 | Postrel | |

OTHER PUBLICATIONS

U.S. Appl. No. 61/429,561, filed Jan. 4, 2011, Confirmation No. 1730.

U.S. Appl. No. 61/531,932, filed Sep. 7, 2011, Confirmation No. 5014.

U.S. Appl. No. 61/531,943, filed Sep. 7, 2011, Confirmation No. 5056.

U.S. Appl. No. 13/214,813, filed Aug. 22, 2011, Confirmation No. 1021.

expedia.com, Hotel Search, Barcelona (and vicinity) hotels, http://www.expedia.co.uk/Hotels?eapid=0&frr=-13019&, accessed May 16, 2011, United Kingdom.

STA travel.com, Hotel Search, City Hotel Hobson Street search, www.statravel.com, accessed May 16, 2011, USA.

Thomas cook.com, Hotel Search, Barcelona (and vicinity) Hotels, http://book.thomascook.com/pub/agent.dll?qscr=htwv&from=m&stat=1&khst=, accessed May 16, 2011, USA.

ebookers.com, Hotel Search, Europark Hotel Barcelona, http://www.ebookers.com/shop/hotelsearch?type=hotel&hotel.type=keyword&hotel, accessed May 16, 2011, USA.

travelbag.co.uk, Hotel Search, http://www.travelbag.co.uk/Accommodation-Search-Results?searchid=375423c2-a044, accessed May 16, 2011, United Kingdom.

thomson.com, Hotel Search, http://www.thomson.co.uk/accom/page/search/searchresults.page, accessed May 16, 2011, United Kingdom.

bookings.com, Hotel Search, http://www.booking.com/hotel/es/royal.html?aid=322178; label=hotel-e-mBDQaRQ%2AoZyzKKBktyM1WQS5764464766;sid=31595907344c38a024b6668abe5ef062;checkin=2011, accessed May 16, 2011, USA.

* cited by examiner

FIG. 2D

FIG. 5B the one or more computers, second conversion data at the travel distribution platform related to the second client request data and the second client response data; storing, by the one or more computers, the second conversion data; and generating, by the one or more computers, a test report using the first conversion data and the second conversion data.

SYSTEM AND METHOD FOR TESTING AIRLINE REVENUE OPTIMIZATION AND RELATED TOOLS OR PRODUCTS FOR TRAVEL

RELATED APPLICATIONS

This application is a continuation of U.S. Non-Provisional patent application Ser. No. 13/495,348, which in turn claims priority to U.S. Provisional Application No. 61/531,943, filed Sep. 7, 2011 and U.S. Provisional Application No. 61/531,932, filed Sep. 7, 2011, the contents all of which are incorporated herein by reference in their entirety. Further, the contents of U.S. patent application Ser. No. 13/214,813, filed Feb. 24, 2012, U.S. patent application Ser. No. 13/214,882, filed Feb. 24, 2012, and U.S. Provisional Patent Application No. 61/429,561, filed Jan. 8, 2012, are incorporated herein by reference in their entirety.

FIELD

The present invention generally relates to air travel distribution platforms and testing tools related thereto.

SUMMARY OF THE INVENTION

In exemplary embodiments, a method for testing and measuring user interaction with respect to one or more changes introduced into a travel distribution platform and measuring the impact across a plurality of variables may comprise the steps of: configuring, by one or more computers operatively connected to a travel distribution platform, test configuration data to define testing parameters for testing modification of offers related to airline services; obtaining, at the one or more computers from the travel distribution platform, first client travel request data received from a first client device requesting information related to airline services; determining, by the one or more computers, whether the first client travel request data comes within testing parameters set by the test configuration data; in the case where the determining step confirms the first client travel request data comes within the testing parameters, generating, by the one or more computers, a first set of instructions for the travel distribution platform, using the test configuration data, to generate modified first client response data from the travel distribution in accordance with the testing parameters in response to the first client request data; transmitting, from the one or more computers to the travel distribution platform, the first set of instructions; monitoring, by the one or more computers, first conversion data at the travel distribution platform related to the first client request data and the first client response data; and storing, by the one or more computers, the first conversion data.

In an at least on exemplary embodiment, the method may further comprise the steps of: obtaining, at the one or more computers from the travel distribution platform, second client travel request data received from a second client device requesting information related to airline services; determining, by the one or more computers, whether the second client travel request data comes within testing parameters sets by the test configuration data; in the case where the determining step confirms the second client travel request data comes within the testing parameters, generating, by the one or more computers, second set of instructions for the travel distribution platform, using the test configuration data, to generate modified second client response data from the travel distribution platform in accordance with the testing parameters in response to the second client request data; transmitting, from the one or more computers to the travel distribution platform, the second set of instructions; monitoring, by In exemplary embodiments, the test configuration data may relate to one or more selected from the group consisting of: duration of the test, start/end time of the test, number of times to run the test, and test trigger. In some exemplary embodiments, the first set of instructions may be associated with one of a plurality of test variants, wherein each of the test variants may indicate one or more modifications to be generated by the travel distribution platform. In at least one exemplary embodiment, the second set of instructions may be associated with a different test variant from the first set of instructions.

In some exemplary embodiments, the first conversion data may comprise information related to one or more conversion actions associated with the client device, and the one or more conversion actions may be selected from the group consisting of: adding an item to a shopping cart, payment and clicking on a link.

In at least one exemplary embodiment, the step of monitoring first conversion data may end when a session associated with the first client device ends.

In some exemplary embodiments, the test report may provide a comparison of one or more monitored conversion actions.

In exemplary embodiments, a system for testing and measuring user interaction with respect to one or more changes introduced into a travel distribution platform and measuring the impact across a plurality of variables may comprise: one or more computers operatively connected to a travel distribution platform, comprising one or more processors, one or more memory units, and a computer-readable storage medium including computer-readable code that is read by the one or more processors and may perform a method comprising the steps of: receiving, at the one or more computers, test configuration data for testing modification of offers related to airlines services associated with the travel distribution platform; obtaining, at the one or more computers, first client travel request data received from a first client device requesting information related to airline services; determining, by the one or more computers, whether the first client travel request data comes within testing parameters set by the test configuration data; in the case where the determining step determines the first client travel request data comes within the testing parameters, generating, by the one or more computers, a first set of instructions for the travel distribution platform, using the test configuration data, to produce modified first client response data from the travel distribution in accordance with the testing parameters in response to the first client request data; transmitting, from the one or more computers to the travel distribution platform, the first set of instructions; monitoring, by the one or more computers, first conversion data at the travel distribution platform related to the first client request data and the first client response data; and storing, by the one or more computers, the first conversion data in one or more databases operatively connected to the one or more computers.

In exemplary embodiments, a system for testing and measuring user interaction with respect to one or more changes and measuring the impact across a plurality of variables may comprise a travel distribution platform, comprising one or more computers operatively connected to a testing module, comprising one or more processors, one or more memory units, and a computer-readable storage medium including computer-readable code that is read by the one or more processors and may perform a method comprising the steps of: receiving, at the travel distribution platform, first client travel request data received from a first client device requesting information related to airline services; transmitting, to the testing module, the first client travel request data; in the case where the testing module determines the first client travel request data comes within testing parameters at the testing module, receiving, at the travel distribution platform from the testing module, a first set of instructions; and transmitting, from the travel distribution platform to the first client device, a generated response to the first set of instructions, wherein the first set of instructions produce modified first client response data from the travel distribution in accordance with the testing parameters in response to the first client request data.

BRIEF DESCRIPTION OF THE DRAWINGS

The objects, features and advantages of the present invention will be more fully understood by reference to the following, detailed description of the preferred, albeit illustrative, embodiments of the present invention when taken in conjunction with the accompanying figures, wherein:

FIGS. 2A-2H are screenshots showing an interface for configuring a test to be implemented within a travel distribution and booking system according to an exemplary embodiment of the present invention;

FIGS. 5A-5D are screenshots showing consumer interfaces according to an exemplary embodiment of the present invention;

DETAILED DESCRIPTION

Various exemplary embodiments of the present invention are directed to systems and methods for measuring user interaction with respect to one or more changes introduced into a travel distribution platform and measuring the impact across a plurality of variables.

Figure 1:
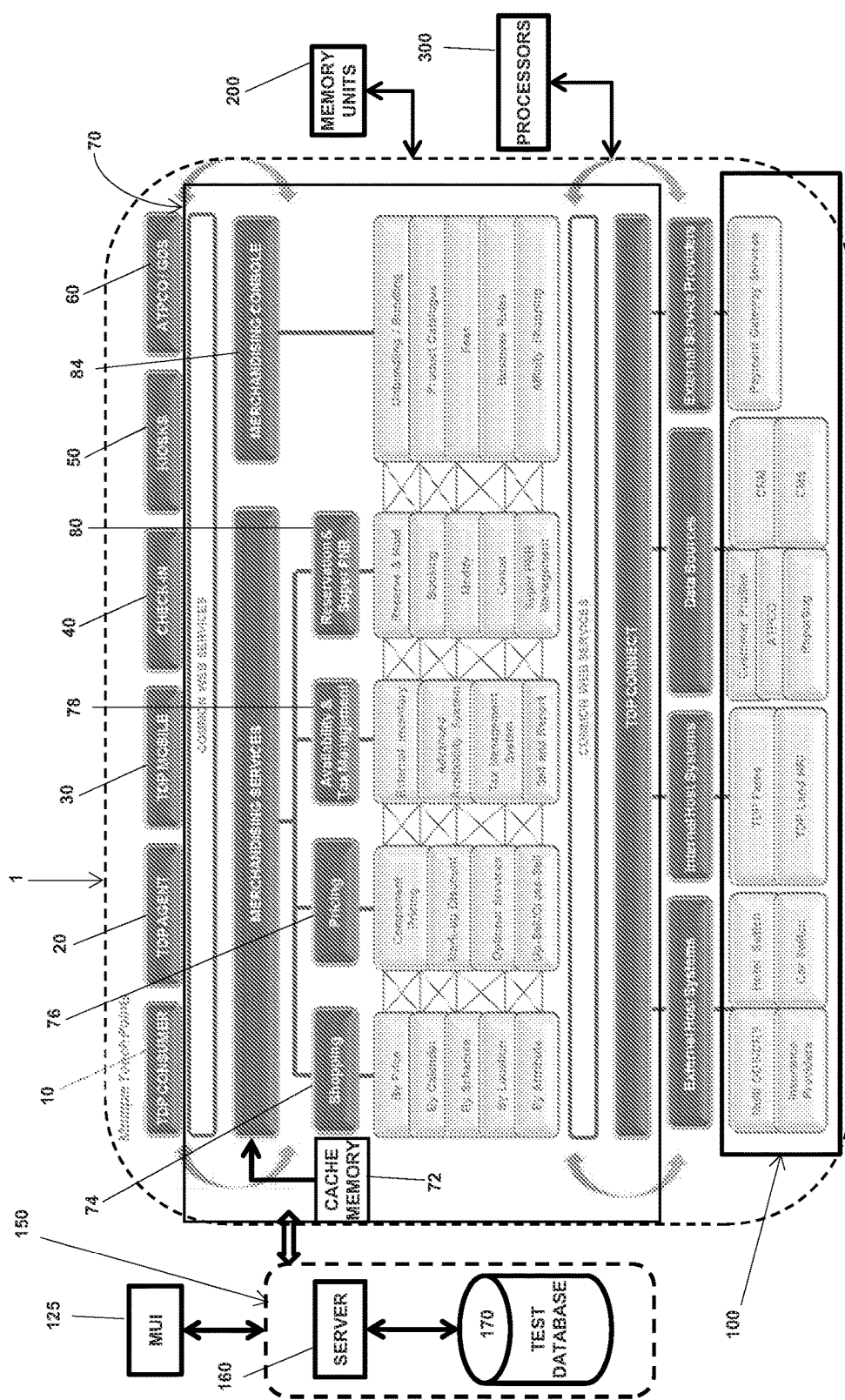
FIG. 1 is a block diagram showing a travel distribution and booking system according to an exemplary embodiment of the present invention.

FIG. 1 is a block diagram showing a travel distribution and booking system, generally designated by reference number 1, according to an exemplary embodiment of the present invention. The travel distribution and booking system 1 includes point-of-sale interfaces, including, for example, a consumer interface 10, an agent interface 20, a mobile interface 30, a check-in interface 40, a kiosk interface 50, and a GDS interface 60, a travel distribution platform 70, generally designated by reference number 70, and a reservation system, generally designated by reference number 100. It should be appreciated that one or more types of point-of-sale interfaces may be used in the system 100 and that each of the above-listed point-of-sale interfaces are not required and that this list of examples is not intended to be exhaustive. For example, other point-of-sale interfaces may be made available at call centers and affiliate distribution channels. It should also be appreciated that the various components of the travel distribution and booking system 1 may be hardware components operating within one or more computers having memory and processor functionality, software embodied as computer readable media including computer readable code readable by on one or more computer processors within a computer environment, or a combination of hardware and software components. In this regard, the travel distribution and booking system 1 may include one or more memory units 200 and one or more processors 300 as necessary to provide a computer environment in which the various components of the system may operate.

In an exemplary embodiment, the travel distribution platform 70 is middleware disposed between one or more point-of-sale interfaces and one or more reservation systems 100. In this regard, the travel distribution platform 70 may be a plug-in to the reservation system 100, or may operate independently from the reservation system 100. In either case, as explained in further detail below, the travel distribution platform 70 exceeds the limitations of a host layer (e.g., CRS and GDS systems) embodied within the reservation system 100 by receiving input from a user and querying multiple systems at the same time. Such systems to be queried include, for example, a GDS or CRS, an airline direction connection, an external or internal database of privately negotiated fares, a car or hotel switch, or any other data source identified by the customer. The limitations of the conventional host layer include, for example, inability to provide product packaging, and inability to support continuous manipulation of fares, fees, fare families and complex calendar shopping. As detailed below, the travel distribution platform 70 is able to provide these and other features in a dynamic and relatively inexpensive manner. The travel distribution platform 70 is able to provide features such as, for example, calendar options, fare families, e-interlining and ancillary services and fees, to name a few, and offers the flexibility and independence to shop and book for any components (air and ancillary), from any source/host, for any point of sale. In this regard, the travel distribution platform 70 supports packaging of air, car, hotel and insurance, to name a few, both in and out of the booking path. The travel distribution platform 70 also supports fare families (e.g., date/route/segmentation control), super PNR, complex calendar shopping and ancillary services/fees, and also manages the reservation which may contain air and non-air components and ancillary components related to air.

The travel distribution platform 70 also may include merchandising service components, such as a shopping component 74, a pricing component 76, an availability and tax management component 78 and a reservation and super-PNR (Passenger Name Record) component 80. The merchandising service components may provide travel suppliers and retailers (e.g., airlines, car rental agencies, hotels, travel agents, tour operators, affiliate partners, to name a few) with a set of tools to create an innovative and independent fares pricing and management system. In general, these components allow the travel distribution platform 70 to provide comprehensive dynamic pricing capability and diverse availability options across all itinerary types. This flexibility may support a variety of booking flows, including lowest fare, preferred flight, flexible destination search, price led search, redemption searches, branded fares and calendar shopping enabling different work flows for each distribution channel. Sophisticated faring capabilities includes ATPCO fares import and pricing, GDS public/private fares pricing, one way (and combinable), multi sector and calendar pricing. Flexible destination searches may also allow customers to find the best deals to the beach or ski resort, or find destination options based on their budget.

The shopping component 74 of the travel distribution platform 70 may provide near real-time travel distribution information based on the data stored in the cache memory 72. For example, the shopping component 74 may organize the data by price, calendar, schedule, location, or by attribute, so as to allow for powerful searches using a broad spectrum of search criteria at cheaper prices compared to searches performed using conventional CRS and GDS systems. The pricing component 76 allows for management of product pricing, such as, for example, providing for component pricing, mark-up/discount, pricing for optional services, and up-selling/cross-selling. The availability and tax management component 78 may include an advanced availability system that allows for dynamic management of an extensive array of availability options and enables rapid and accurate responses in near real-time that significantly reduces the volume and cost of transactions required to host systems (e.g., CRS, GDS). The availability and tax management component 78 may also include a tax management system that is linked to a tax management database containing near live tax values, which are updated on a regular basis. The tax management system reduces the number of hits to the GDS/CRS for tax information, and lowers response times for fare requests. The reservation and super PNR component 80 may allow for reserve and hold, booking, modification and cancellation of reservations, and may also provide for customer profiling based on booking behavior.

The travel distribution platform 70 may also include a merchandising console 84 that provides for even more flexibility in dynamic pricing capability and availability options. For example, the merchandising console 84 may allow for unbundling or bundling of products, the generation of a product catalogue, fees (e.g., how much to charge for a particular extra item, such as extra baggage), and affinity shopping (i.e., personalized shopping based on consumer data). The merchandising console 84 may also include a business rules engine that gives travel suppliers and retailers control over the shopping process and manipulation of availability, fares, taxes and fees independent of the CRS/GDS. In this regard, the business rules engine may include a series of templates that allow for easy modification of information within the templates to result in implementation of a new business rule or modification of an existing business rule. The merchandising console 84 may allow travel suppliers or retailers to configure, set-up and manage, in advance or in real-time, entire advertising campaigns, including development and input of advertisement and distribution rules, set-up and management of distribution channels, tracking use of the system and reporting.

The point-of-sale interfaces, including the consumer interface 10, agent interface 20, mobile interface 30, check-in interface 40, kiosk interface 50, and GDS interface 60 may be generated by the travel distribution platform 70. In this regard, the point of sale interfaces may display the near real-time data intercepted and organized by the travel distribution platform 70 so as to provide the user with search results and booking information in a rapid and flexible manner. For example, the consumer interface 10 provides an online booking platform that lets a travel supplier or retailer to drive its direct online channel and profitability by offering merchandised fares and ancillary content via a one-stop shopping solution as part of a multi-channel strategy. The consumer interface 10 reduces distribution costs by moving customers away from call centers, reducing call volume and providing a self-service tool that allows customers to take control of their reservations. The consumer interface 10 may also provide a multi-lingual and multi-currency point of sale so as to reach customers in all global markets and tailor their online experience.

The reservation system 100 may include external host systems, such as, for example, the airline CRS, all the main GDS systems and other enterprise systems including payment providers, hotel, insurance and car suppliers, to name a few. The travel distribution platform 70 is integrated with one or more reservation systems 100 through one or more adapters, so that, from a single search, the travel distribution platform 70 may provide a one stop shop that simultaneously connects to multiple hosts and returns the priced options in a single display. The reservation system 100 may also include internal host systems, such as, for example, a land services component provided by the travel distribution platform 70. The land services component may enable airlines to search for and price ancillary products and inventory by providing a set of tools and web-services based connections to partners, such as cars, hotels and insurance partners, to name a few. The land services component allows airlines to package multiple content that complements air products in order to offer real time bundled pricing and reservations. The reservation system 100 may also include and/or operatively connect with data sources, such as, for example, customer profiles, ATPCO, reporting, car rental agency databases, hotel reservation databases, insurance fee databases, private fare databases, CRM, and CMS, to name a few and also external service providers, such as, for example, payment gateway services.

As shown in FIG. 1, the travel distribution platform 70 may include and/or be operatively connected to a testing module 150. In exemplary embodiments, the test module 150 may include one or more servers, such as server 160 operatively connected to one or more databases, such as testing database 170.

In exemplary embodiments, server 160 may be an application server and may run on one more processors. Server 160 may interact with one or more of the services provided by the travel distribution platform 70. The server 160 may receive and process one or more requests from end-users as well as receive and process responses from the various services of the travel distribution platform 70.

In exemplary embodiments, testing database 170 may be implemented as any suitable type of database system, including, for example, commercial, open-source, SQL, or NoSQL systems to name or a few.

In exemplary embodiments, the testing module 150 may be independent of the point-of-sale interfaces so as to allow a client-user, e.g., an airline agent/administrator, to create and/or setup one or more tests to gauge customer/end-user behavior that may also be implemented and operate independently of the point-of-sale interfaces. For example, the testing module 150 may implement tests in the service layer by generating and/or providing code and/or data to the various services based on test configurations specified by the client-user. Because the testing module 150 may be independent of the point of sale, it is able to run a single or multiple tests across multiple points of sale without requiring any change or management of the point of sale itself.

For example, the testing module 150 may, in conjunction with the various services of the travel distribution platform 70, implement tests that may be pushed to any one or all of the multiple touch points that a user may access, such as for example, the consumer interface 10, the agent interface 20, the mobile interface 30, the check-in interface 40, the kiosk interface 50, and the GDS interface 60. In other words, the testing, the monitoring, and providing of results do not need to be accomplished from a presentation layer, e.g. a website, but are rather invoked and monitored from within the layer(s) of the travel distribution platform 70 having the one or more services themselves. The server 160, for example, may receive and process the messages sent between end-users and the travel distribution platform 70 in order to implement one or more tests. The testing module 150 may seed, or provide code, e.g. XML, and/or data to one or more services of the travel distribution platform 70 in order to inject or implement desired changes with respect to a implemented tests. In exemplary embodiments, the code, data, and/or associated rules for the one or more configured tests may be stored in the testing database 170, and/or may be stored in any other suitable computer readable storage media associated with the travel distribution platform 70. The changes to be implemented may be subject to and checked against the existing business rules for the one or more services of the travel distribution platform 70.

Figure 2:
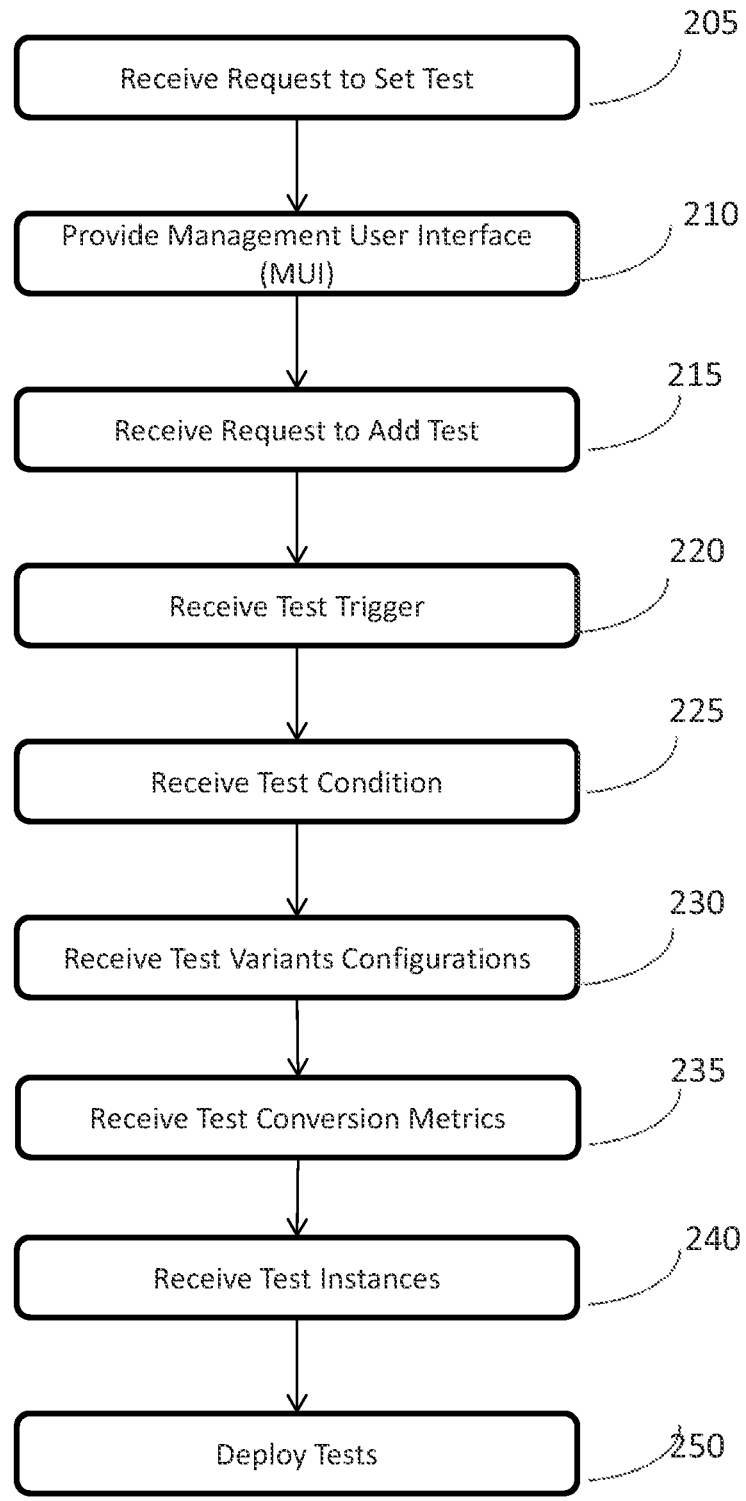
FIG. 2 is a flow chart showing a method for configuring a test to be implemented within a travel distribution and booking system according to an exemplary embodiment of the present invention.
Figure 2A:
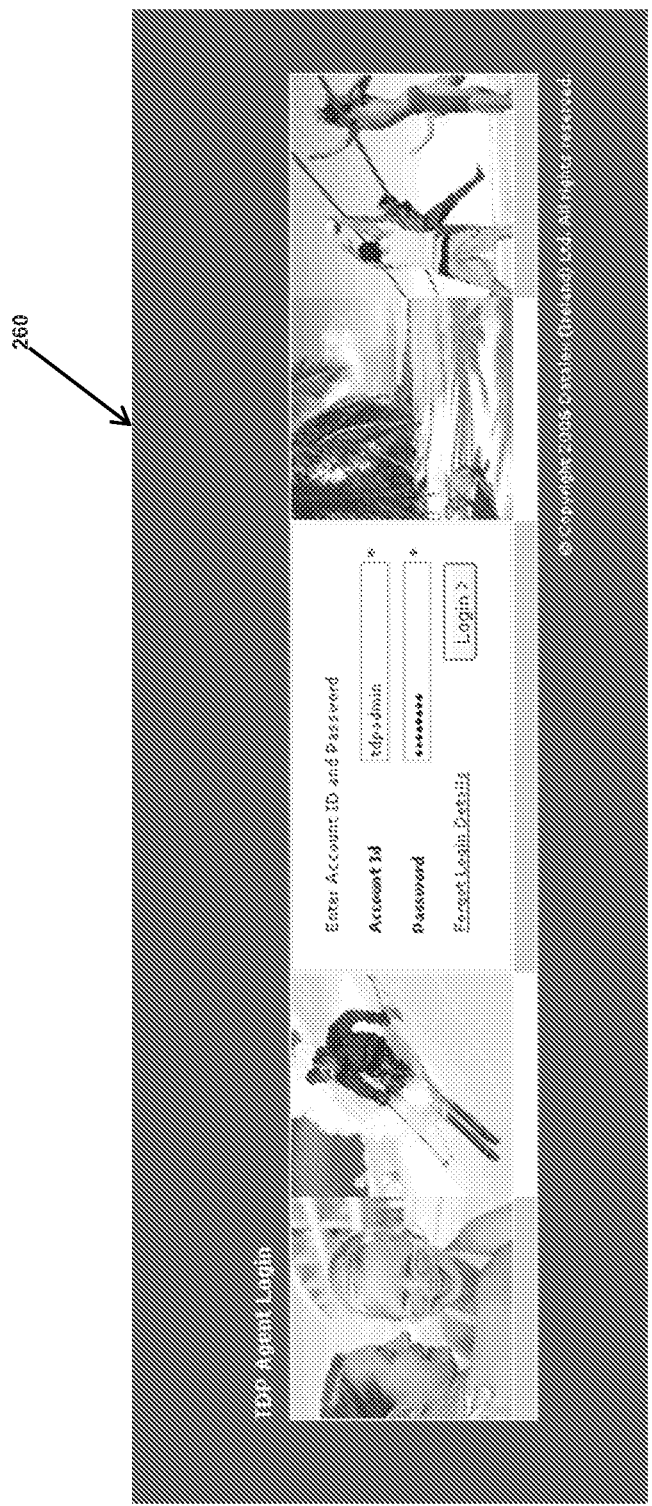

FIG. 2 shows a flowchart illustrating a method for creating and/or implementing tests within the travel distribution platform 70 according to an exemplary embodiment. As a result of the process, test and/or code may be generated or created and/or stored for later to use to implement one or more tests. At step 205, the server 160 of the testing module 150 may receive a request to add a test and/or modify existing tests. At step 210, the testing module 150 and/or travel distribution platform 70 may generate and/or provide a management user interface (MUI) to a device associated with the requestor/client-user. FIG. 2A shows a screen shot of a log-in screen 260 for an MUI according to an exemplary embodiment, where a client-user has provided an account id and a password in order to be provided greater access to the MUI. The login screen may request other types or additional information as necessary to provide access.

Figure 2B:

FIG. 2B shows a screen shot of a setup landing page 265 of the MUI according to a exemplary embodiment. The setup landing page 265 may display a list of existing tests and some of their associated information, such as, for example, configuration codes, test name, status, and last run, to name a few.

Figure 2C:
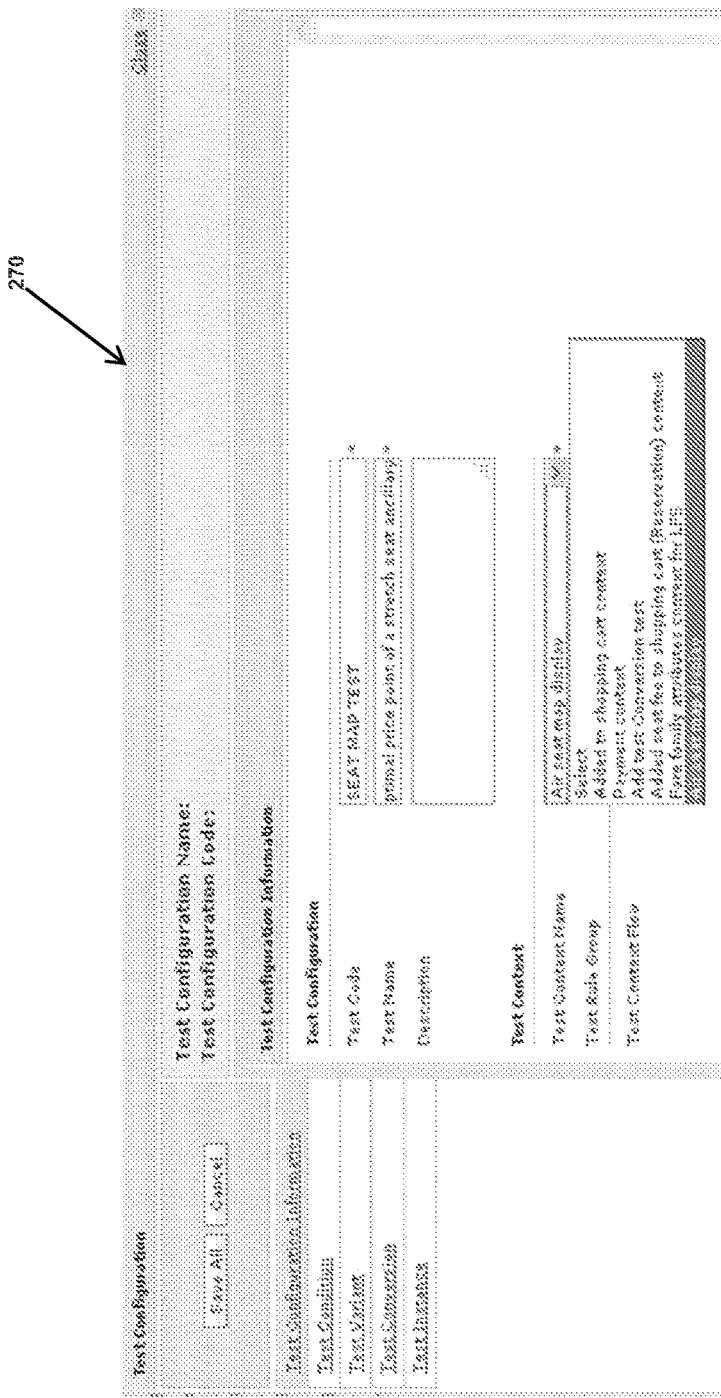

After accessing the MUI, at step 215 a request to add a test may be received. FIG. 2C shows a screen shot of a test configuration interface 270 of the MUI according to an exemplary embodiment. The MUI may provide any suitable combinations of text entry fields, drop-down boxes, and the like for specifying test parameters. For example, as explained in more detail below, the test configuration interface page 270 may allow for input of information related to test configuration, test condition, test variant, test conversion, and test instance, to name a few.

At step 220, the client-user may specify a "test trigger". The test trigger, or test context, may be the point where a test instantiates or begins. For example, at the test trigger, one or more changes may be injected into end-users' e-commerce flow when they are interacting with the travel distribution platform 70. Referring to FIG. 2C, the test configuration interface 270 may include a test configuration page that allows for input of a test trigger. For example, the test configuration page may include a drop-down box labeled "Test Context Name" which may provide a list of service contexts at which tests can be triggered, and a change introduced. FIG. 2C shows the selection of the 'Air seat map display', indicating that a test is triggered when a seat map service is requested in response to a user action. It is to be appreciated that the list of services that tests can be run against are not limited to those listed in FIG. 2C. In exemplary embodiments, the selected text context may any one of the services provided by the travel distribution platform 70, such as those illustrated in FIG. 1.

Figure 2D:
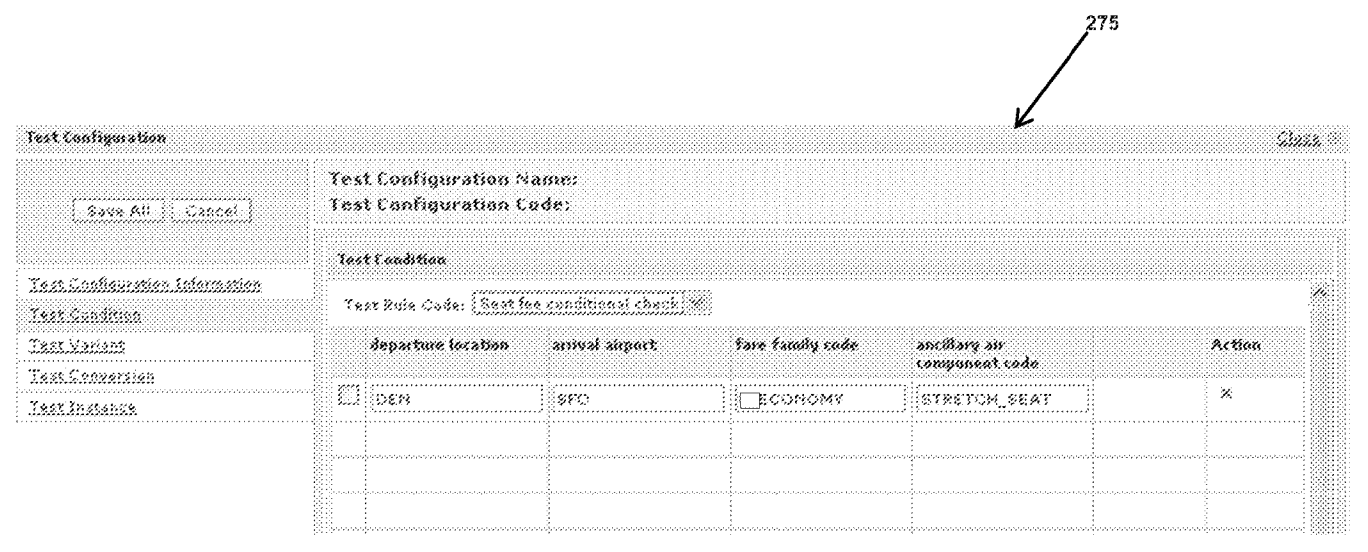

At step 225, a test condition may be configured for the added test. For example, the test condition may be suitable conditional rules that determine the specific types of end-users that may participate in a given test. In an exemplary embodiment, the test condition may act as a filter. FIG. 2D shows a screenshot of a test condition page of the test configuration interface 275 according to an exemplary embodiment of the present invention. FIG. 2D shows a test condition or conditional rule selected from a drop-down box, specifically the "Seat fee conditional check" option. This particular test condition relates to the seat fee options. FIG. 2D further shows that the test condition has been specified for end users who have searched and selected Denver (DEN) to San Francisco (SFO) flights as well as selected a specific fare option (family code "ECONOMY") and a specific stretch seat option ("STRECH_SEAT").

In exemplary embodiments, any number and variety of conditional rules may exist. Further, the conditional rules may be linked with one or more business rules of the travel distribution platform 70. In other words, the conditional rules may be based at least in part on the existing business rules for the one or more services provided by the travel distribution platform. As such, the testing module 150 may interact with a business rule engine so as to provide possible conditional rules for a given text context or check whether a specified conditional rule is valid.

It should be appreciated that any combination of parameters associated with the various services provided by the travel distribution platform 70, such as, specific point of sale, origin-destination, country, region, passenger type, persona, price, inventory source, number of passengers, date and time of request, currency type, reward program status, ancillaries chosen, number of passengers, payment type, to name a few, may be used in some manner as the conditional rules for one or more test conditions. The testing module 150 may process the various request/response messages transmitted/received with respect to the travel distribution platform 70 in order to implement conditional checks.

In some exemplary embodiments, no conditional rules may exist and/or be specified by client-users. For example, all end-users within a given context may trigger the test and/or participate. In some exemplary embodiments the conditional rules may be specified automatically by the testing module 150.

In exemplary embodiments, after a client-user has specified one or more conditional rules for a given test, the conditional rules may be checked for validity. For example, a client-user may enter or specify a parameter that may or may not be supported by business rules of a particular service of the travel distribution platform, such as, for example, may not be compatible for the given client's capabilities. For example, referring to FIG. 2D, a client-user may specify a test condition for Denver to San Francisco flights. If, however, the airline does not provide such flights, the MUI may not allow the test setup to proceed and may provide an error warning/message to the client-user.

At step 230, test variants may be configured for the added test. For example, test variants may define the changes that are to be made in a given test, such as, for example, in response to service requests and/or to service responses. In exemplary embodiments, two or more test variants may exist for a particular test. For example, one test variant may modify/change the price of a product/service offered to an end-user, whereas another variant may modify/change the presentation of information displayed to an end-user. Other variants may include no changes, e.g., a control variant.

In exemplary embodiments, the changes to be implemented may be subject to the existing business rules for the particular service, e.g. the context where the change is to be implemented. For example, test variants may have a one-to-one relationship with rules from the business rules engine.

In exemplary embodiments, test variants may be configured to at least change aspects such as, for example, product price, promotion, content or presentation tier, and any combinations thereof, to name a few.

Figure 2E:
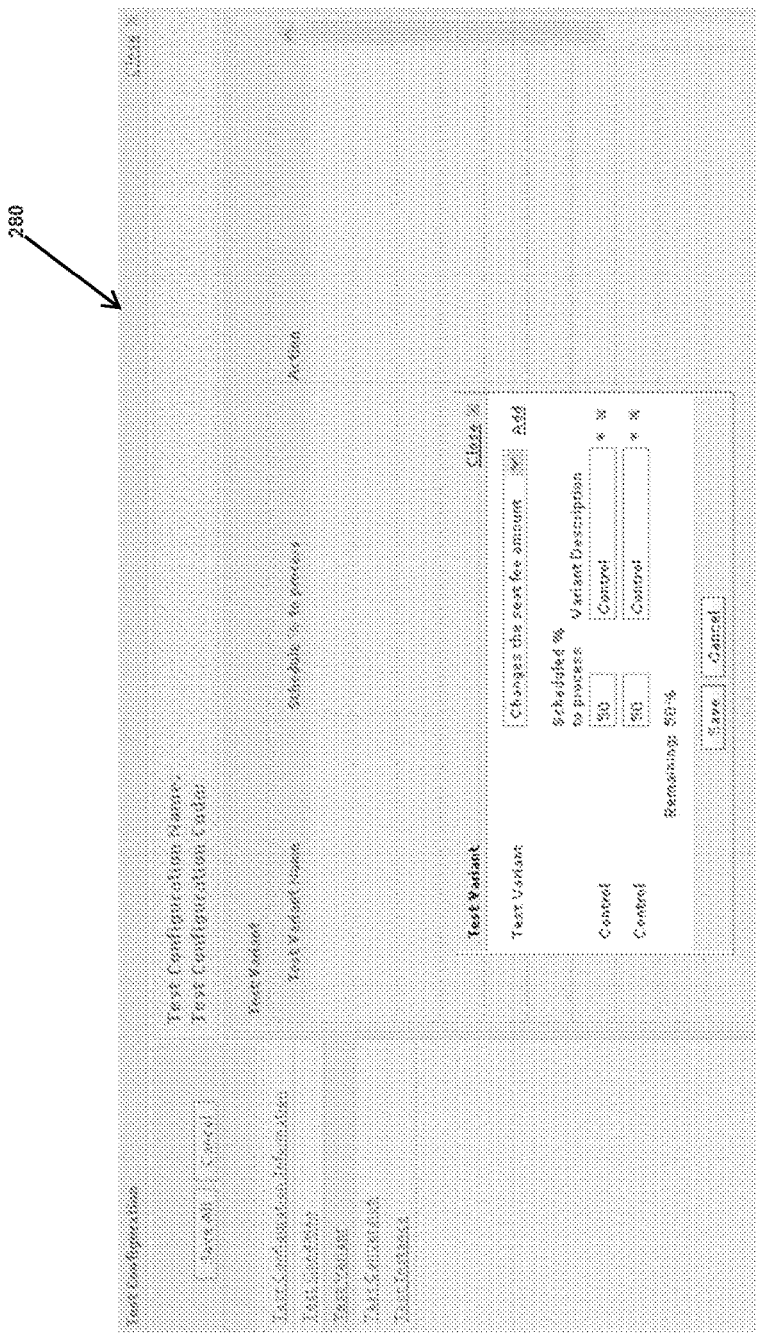

FIG. 2E shows a test variant page of the test configuration interface 280 according to an exemplary embodiment. The test variant page may allow for input of information related to changes to be made to an offered product as part of a particular test. For example, the test variant page may include a drop-down box that allows for selection of a particular test variant from a list of provided test variants. FIG. 2E shows a drop-down box with the selected test variant, "Changes the seat fee amount." The drop-down box may contain other possible test variant changes. The test variant changes may be based on previously defined test configurations, such as, for example, the test trigger and/or the test conditions. In other words, the options such as price changes, presentation changes, etc. may be presented as options to the client-user based on the previous specified test context. If, as shown in FIG. 2C, a client-user selected "Air seat map display" for the test trigger or test context, then the MUI may present test variant options which may include seat fee price changes, which is specific to the "Air seat map display" context. If a different trigger and/or context was previously chosen, the options presented may reflect the selected test trigger/context.

In some exemplary embodiments, the test variant changes may be entered manually and not selected from a drop-down box with pre-defined options. Test variant changes may be selected from a set list using other interface tools besides a drop-down box.

In exemplary embodiments, client-users may specify multiple variants. For example, returning to the example using the configured "Air seat map" context, a client-user may specify a control variant and a price change variant. The price change variant, for example, may specify charging some users a modified price and the control variant may specify charging other users an unmodified or regular price. This may allow the testing module 150 to record data with respect to both variants. In exemplary embodiments, the testing module 150 may allow a client-user to specify how much each variant may execute as an amount and/or percentage of test users. Referring to FIG. 2E, the MUI may include "scheduled % to process" fields to allow client-users to configure the amount of web traffic from the total population of visitors/end-users that pass the pre-defined test condition that will experience each of the specified variants for a given test.

FIG. 2E shows, for example, 50% of the traffic is sent to each test variant. In some embodiments, the MUI may by default prefill the percentage to be sent to each variant, such as, for example, with an equal share of the traffic for each variant. In exemplary embodiments, any split of traffic may configured, such as even or uneven traffic. The MUI may require that the total traffic for each variant adds up to 100%. For example, a client-user may specify a price variant that is to execute for 5% of visitors, and a control variant to execute for the other 95%. Further, as previously mentioned, there may more than two variants with respect to a given test, e.g. 3, 4, 5 . . . N variants. For example, a client-user may specify a plurality of price changes within a given test. Moreover, each variant may include more than one price change, e.g. a reduction or increase in price for one or more items/services.

At step 235, test conversion metrics, also known as "Key Performance Indicators", may be configured for the added test. In exemplary embodiments, test conversion metrics may be linked and/or based on the business rules for the particular test. For example, conversion metrics may be added and recorded which relate to whether or not end-users have selected presented options, added products/items to a product to a shopping cart, paid for products/items, switched selections and the like. In other words, the test conversion metrics may be configured to determine what "success" or "failure" means for a given test.

Figure 2F:
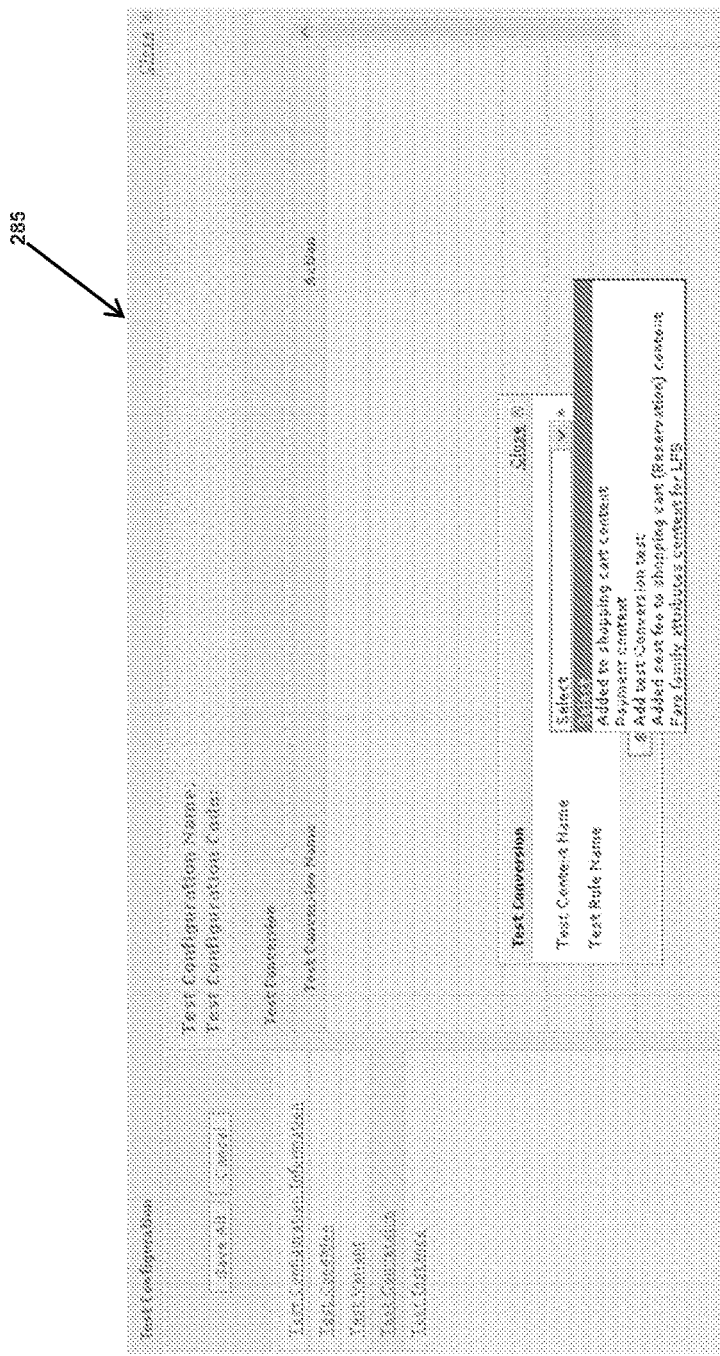

FIG. 2F shows a screen shot of a test conversion page of the test configuration interface 285 according to an exemplary embodiment. For example, the test conversion page may provide a drop-down box with pre-defined conversion metrics for a given test depending on the pre-specified test trigger/context. In some embodiments, the test configuration interface may allow a user to manually enter and specify a desired conversion metric. In exemplary embodiments, conversion metrics may be measured and/or determined, as with other aspects of a given test, by the particular service requests and responses with respect to end-user interaction within the travel distribution platform 70.

Figure 2G:
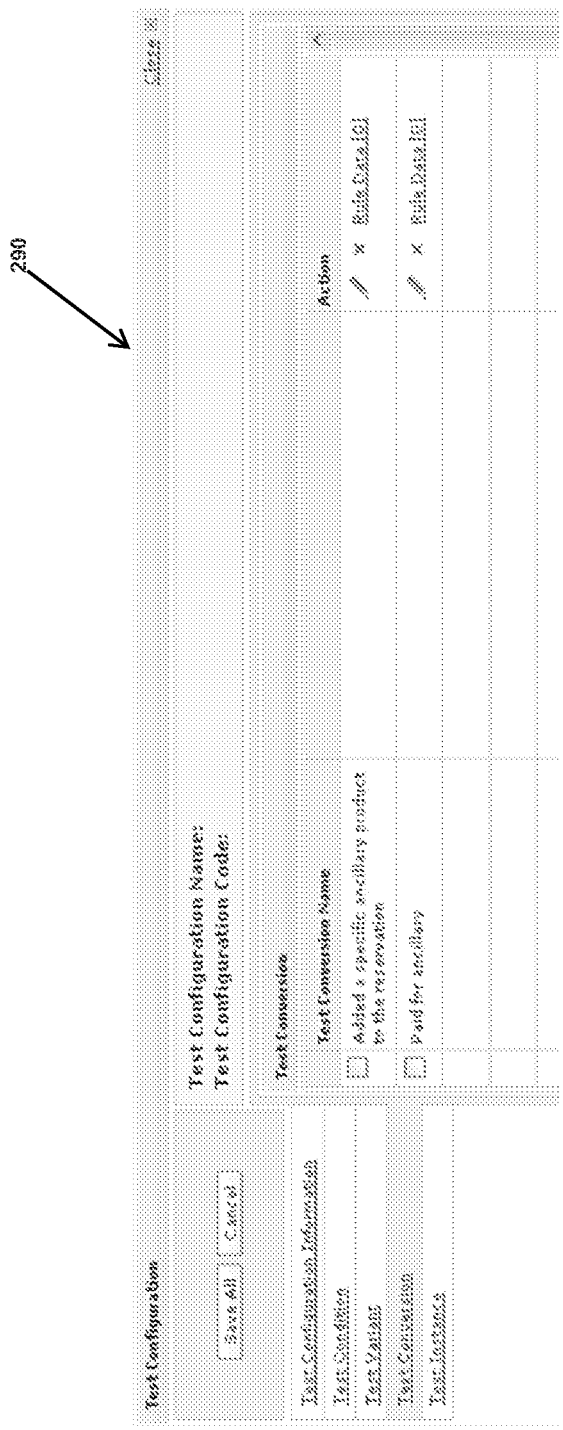

In exemplary embodiments, a client-user may specify one or more conversion metrics with respect to a test. FIG. 2G shows a screen shot of the test conversion page reflecting that a client-user has specified two conversion metrics for a test, namely a first conversion metric related to whether an end-user has added an ancillary to their shopping cat, and a second conversion metric related to whether an end-user has booked and paid for the ancillary. In exemplary embodiments, ancillary may include services, such as insurance, priority express check-in, premium seats, onboard internet, duty free shopping, shop-by-budget and television service, to name a few. In exemplary embodiments, the conversion metrics may be user-definable or may be selected from pre-defined options presented to the client-user.

In some exemplary embodiments, conversion metrics may be configured and/or measured for events that did not occur. A client-user may desire to measure the effect of a change, such as price change, on the conversion of other items unrelated to the product/item price that has a price change. For example, if a test includes a price change to an air seat, then a user may also measure the effect on other things, such as ancillary, hotel, car, or other items.

At step 240, test instances may be configured for the added test. In exemplary embodiments, an end-user may configure when, for how long, and how many times a given test should run. For example, each added test may be run multiple times at various set times. This may be done to check if the results are repeatable or how results/metrics vary depending on the test run time.

Figure 2H:
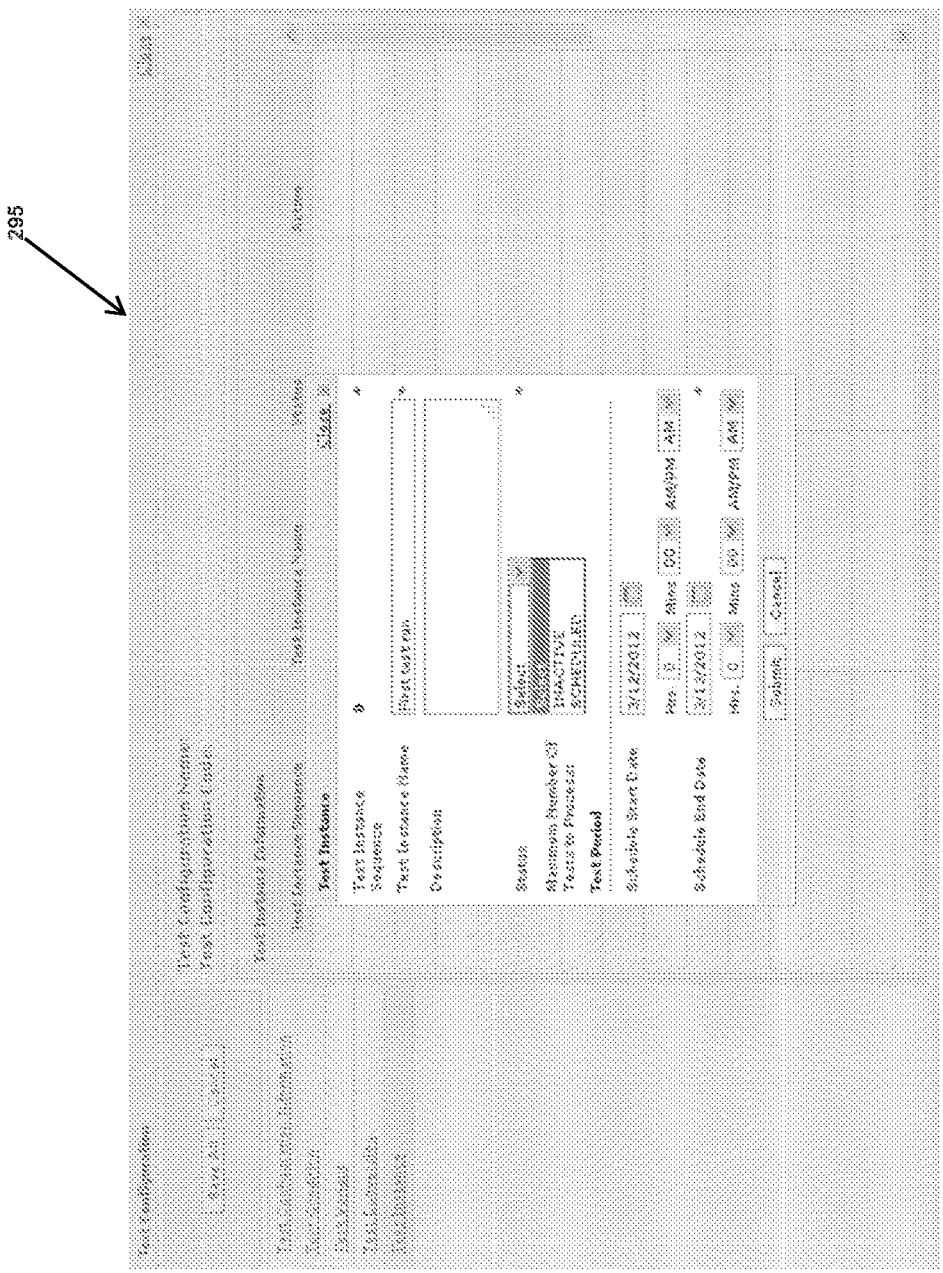

FIG. 2H shows a screen shot of a test instance page of the test configuration interface within the MUI. For example, a specific test instance may include a scheduled start and end time. FIG. 2H also shows that a client-user may specify the maximum number of tests to process, e.g., how many users may participate in the test. For example, a particular test may end before the schedule end time if the maximum number of users is reached before the end time. In some exemplary embodiments, a client-user may not specify a scheduled test run time.

Referring to FIG. 2H, a client-user may specify via the test instance page a test instance as being active until a specified maximum number of users is reached and may make the test instance inactive at a scheduled time or upon manual entry of inactive status.

In exemplary embodiments, a test may performed in the past, e.g. a test may be implemented using historical data saved by the travel distribution platform 70. For example, a client-user may schedule a test instance at a scheduled time in the past.

In some exemplary embodiments, the MUI may allow a client-user to preview a test. The MUI may present the test as it would appear to an end-user and show how end-users who have triggered the test may be presented with changes based on specified test configurations. The testing module 150 may implement a preview as, for example, one or more screenshots, or as a video showing a sample user interacting with the travel distribution platform.

In exemplary embodiments, configuration data for tests may be stored in the testing database 170. When a test is invoked, the server 160 may access the testing database 170 as well as interact with the various other components or services of the travel distribution platform 70 in order to implement the changes into the various services.

It can be appreciated that various types of tests may be implemented using the travel distribution platform 70. For example, other types of tests may include changes to promotions presented to end-users, such as, for example, with respect to different fare families. Various tests may be implemented, for example, that include reducing a price differential between a lowest and a second lowest fare family. For example, the test may include a variant that presents a promotion for reducing the price of the second lowest fare family. In such a test, other variants/changes may also be included. A client-user may configure/specify another variant, where end-users are to be presented with a promotion for the second fare family at regular price, but with an option to have an extra checked bag at no extra charge. A third variant a client-user may specify may include a promotion for the reduced second family fare with the extra benefit of no extra cost for checking an additional bag. Another variant may be a control group, where all fares and fees are presented at their original/unmodified prices. The test may measure how effective the promotion is, e.g. how it affects users buying the second fare family, while also measuring the conversion rates with respect to the lowest fare family. Similarly, such a test may also measure other cross-effects, such as the effects on a customer paying or not paying for one or more ancillaries.

Other promotions or changes may involve hotels, rental cars, vacation packages, or any other ancillary associated with the travel distribution platform 70.

Figure 3:
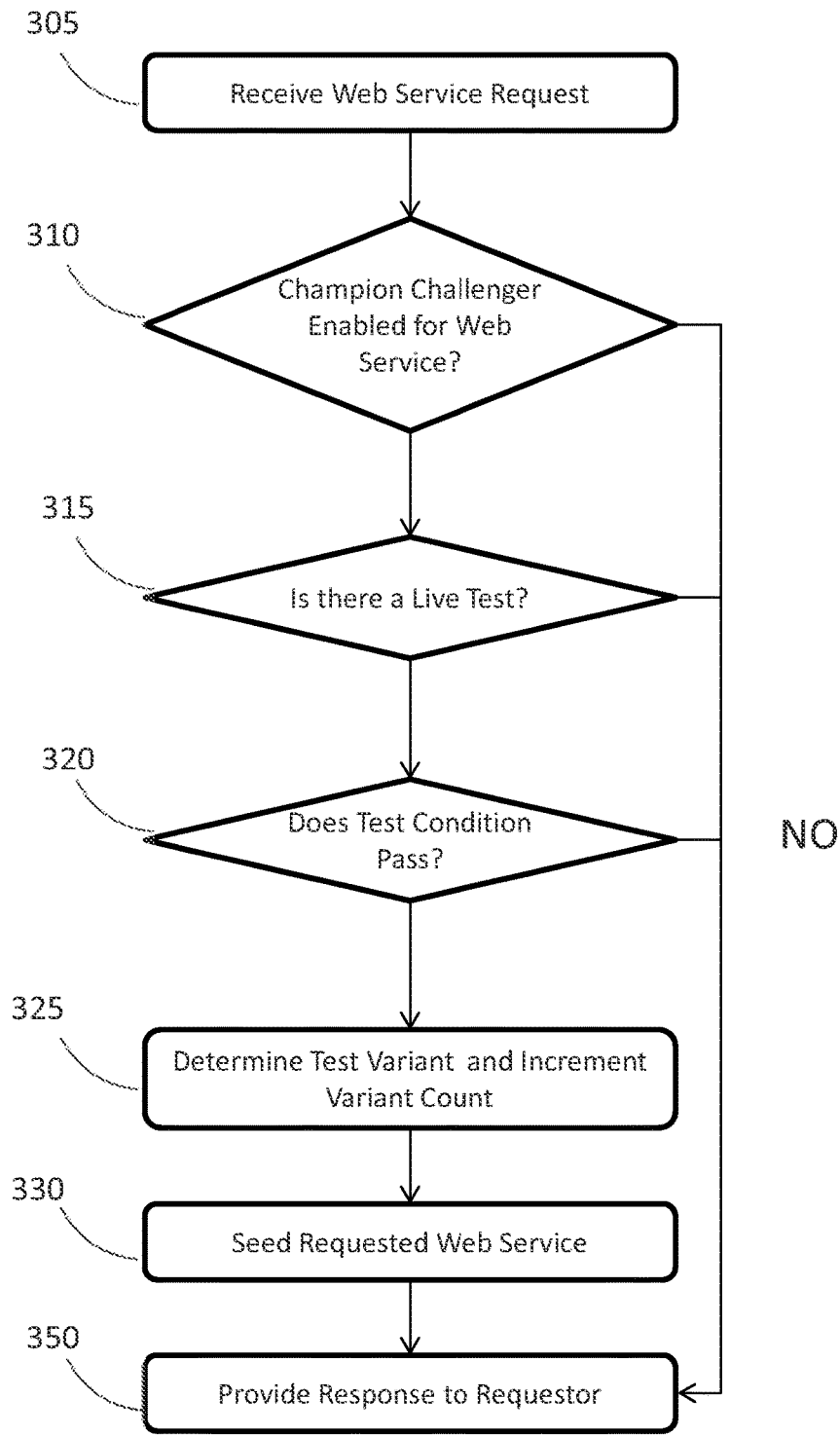
FIG. 3 is a flow chart showing a method for implementing a test within a travel distribution and booking system according to an exemplary embodiment of the present invention.

FIG. 3 shows a flow chart illustrating a method for instantiating a test within the travel distribution platform 70 according to an exemplary embodiment. At step 305, the testing module 150 may receive a service request. For example, the server 160 may receive a service request directly or via the travel distribution platform 70. In exemplary embodiments, a request may be received from one or more point-of-sale interfaces, such as, for example, a consumer interface 10, an agent interface 20, a mobile interface 30, a check-in interface 40, a kiosk interface 50, and a GDS interface 60. In exemplary embodiments, a request may identify an end-user/visitor and/or may provide/identify information or characteristics regarding the end user/visitor.

At step 310, the testing module 150 may determine whether or not testing is enabled for the service which is being requested. For example, the server 160 may access the testing database 170 to access data that indicates if testing is enabled for the service being requested.

If a test is not enabled for the given context, e.g., service, then at step 350, the a response to the request may be provided. For example, the web request may be forwarded to the appropriate service where a response may generated as normal, e.g. without any interaction from the testing module 150.

However, if the testing module 150 determines testing is enabled for the particular service, then at step, 315, the testing module 150 may determine whether a test is currently active, e.g., a live test running for the requested service. In exemplary embodiments, the server, or any other suitable component of the travel distribution platform 70 may access the testing database 170 to determine if there is an active test. If there is no currently running test, then a regular response to the service request may be generated at step 350, as described above.

If the testing module 150 determines that there is a currently active test for the service being requested, the testing module 150 may determine whether one or more conditional checks, or the test condition is passed at step 320. For example, the testing module 150 may allow the test for the service to proceed/execute only if the conditional checks are met. In exemplary embodiments, conditional check information may be stored in the testing database 170, which the server 160 may access so as to check against the service request. In some exemplary embodiments, no conditional checks may be configured, and the test may proceed automatically.

If the test condition or conditional checks passes, then the testing module 150 may determine the variant to execute and increment the variant count, at step 325. In exemplary embodiments, the testing database 170 may record the number or amount of transactions processed for each variant of a test. The server 160 may access such information from the testing database 170 to determine which variant should execute. For example, in cases where there are two configured variants, and each variant is configured to be exposed to 50% of traffic, then if the first variant of the test has been executed/performed 5 times and the second variant has performed/executed 4 times, then the testing module 150 may determine that the second variant is to be executed next. It may be appreciated that the method of choosing the variant to execute may vary depending on circumstances and performance of the testing module 150.

In exemplary embodiments, by executing a particular variant, the testing module 150 may modify all or some of the requests and responses between the end-user/visitor and the travel distribution platform 70 for a particular session.

This may allow the testing module 150 to track and measure the conversions for the particular session.

At step 330, the testing module 150, may provide a modified service request to the requested service, based on the variant to be executed. In this regard, the testing module 150 may provide and/or "seed" to the requested service data and/or code in order to inject/implement a change, so as to invoke a response different from a "normal" response. In exemplary embodiments, the testing database 170 may, via the server 160 or any other suitable engine, provide data and/or code to the requested service based on the test configuration settings.

At step 350, a response from the service to the end-user may be provided. For example, the response may be manipulated and/or recorded by the testing module 150 in the testing database for data collection and/or reporting.

Figure 4:
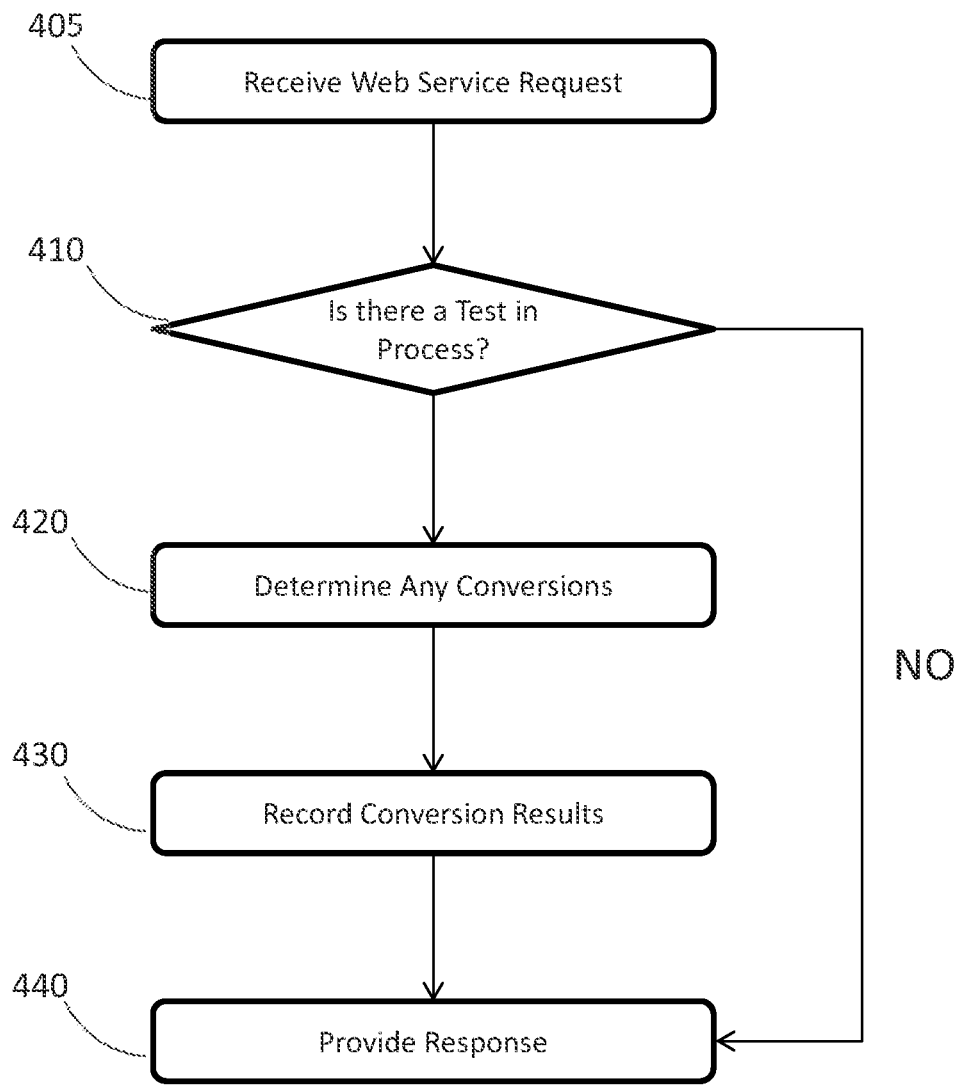
FIG. 4 is a flow chart showing a method for implementing a test within a travel distribution and booking system according to an exemplary embodiment of the present invention.

FIG. 4 shows a flow chart illustrating a method for determining a conversion for a configured test within the travel distribution platform 70 according to an exemplary embodiment. For example, following the method of FIG. 3, a test instance may have already started or instantiated with respect to a given session. At step 405, the testing module 150 may receive a service request. As previously explained the service request may be received by the testing module 150 directly or via the travel distribution platform 70, such as from a point-of-sale interface.

The testing module 150, may determine whether testing is still active in step 410. Data indicating testing status, as previously explained, may be stored in the testing database 170. A test instance for a session, for example, may end prematurely, before any conversions are measured because of reasons such as a client-user having deactivated the test, the scheduled end time of the test has arrived, and/or the maximum number of users/tests has already been reached, to name a few.

If the testing module 150 determines there is no test in process, then the testing module 150 may no longer record and/or measure any interactions by the end-user/visitor, and simply provide a normal response, at step 430.

If a test is still determined to be in process, then at step 420, the testing module 150 may determine if there have been any conversions based on the requests and/or responses between the end-user and the travel distribution platform 70. For example, a conversion such as, whether or not an item was added to a shopping card, a product/service was paid for or clicked on, may be determined. At step 430, the server 160 may record any conversions in the testing database 170.

At step 440, a response from the requested service to the end-user may be provided. For example, the response may be manipulated and/or recorded by the testing module 150 in the testing database for data collection and/or reporting purposes.

FIGS. 5A-5D are exemplary screen shots of consumer interface 10 according to an exemplary embodiments, where a test with respect to air seat display may be invoked. The illustrated test is similar to the Air Seat Display test example described above with reference to FIG. 2 where a test is configured by a client-user with the following exemplary settings: a test trigger context of an air seat map display, a test condition or conditional check for users that search for flights from Denver to San Francisco, and two variants, a price variant and a control variant.

Figure 5A:
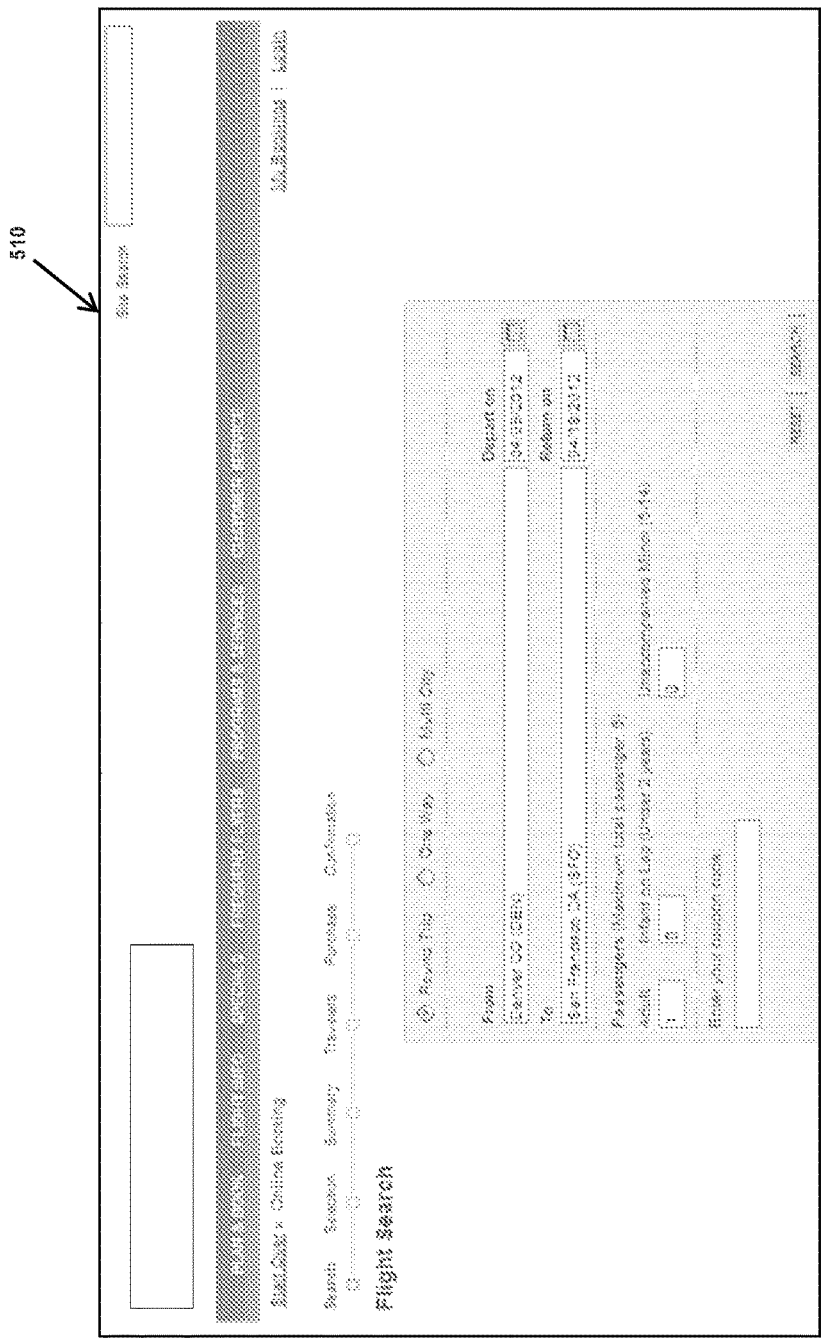

Referring to FIG. 5A, a consumer interface may be provided so that a end-user may search for fares according to user specified criteria. For example, FIG. 5A shows an end-user requesting fares for one adult flying from Denver to San Francisco, with a departing date of Apr. 9, 2012 and a return date of Apr. 19, 2012.

Figure 5B:
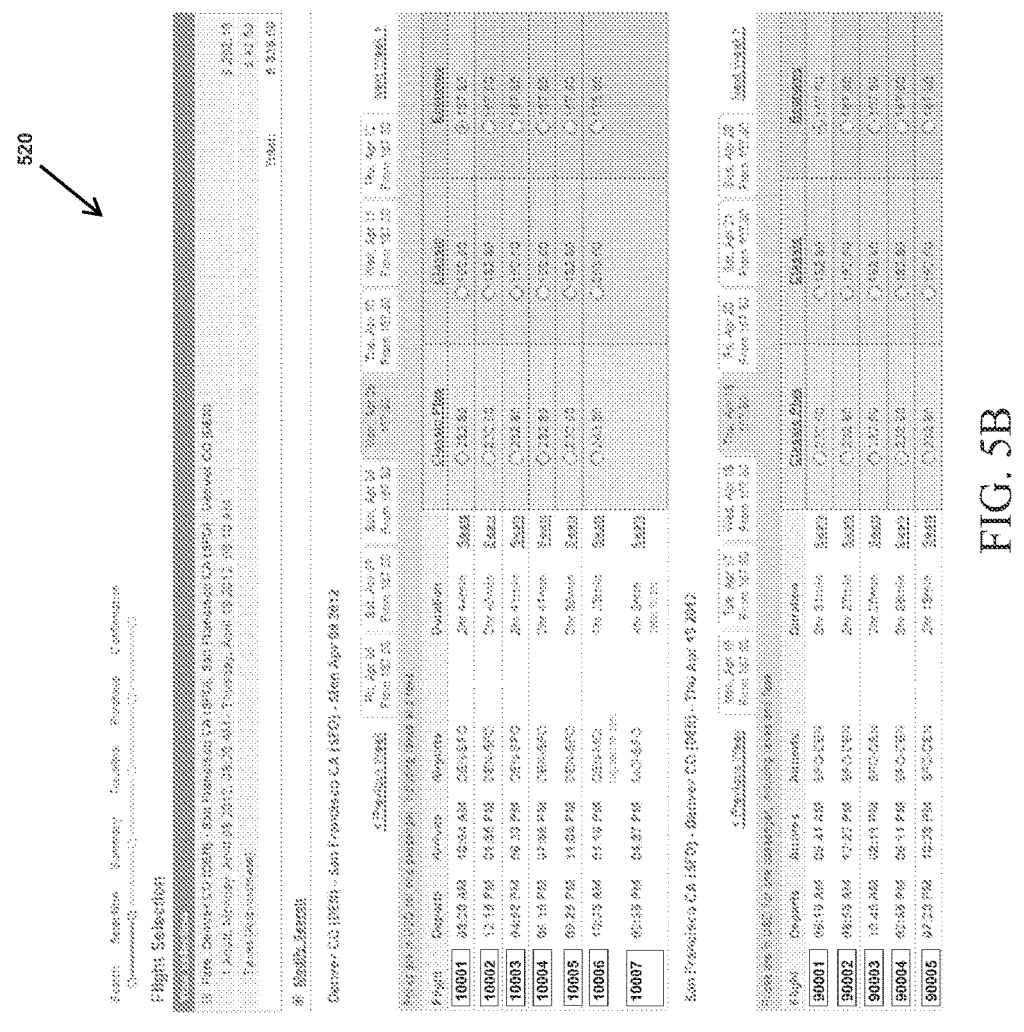

FIG. 5B shows a consumer interface presented to an end-user in response to the search request illustrated in FIG. 5A. The consumer interface 10 shows exemplary fare pricing which includes taxes for a particular flight selection, and shows, for example, date, flight information and fare level ("Economy", "Classic" or "Classic Plus"). Other information relating to a potential booking may also be displayed. The interface may provide advanced shopping features, including, by way of example, fare families, calendar shopping and integrated ancillary services, such as insurance, priority express check-in, premium seats, onboard internet, duty free shopping, shop-by-budget and television service, to name a few.

In exemplary embodiments, a test is not invoked/triggered until test conditions are met. For example, any user who has entered a search as shown in FIG. 5A may be presented with the same interface and same flight search results of FIG. 5B. FIG. 5B shows a first listed flight in the departing section with the "Economy" option selected and a first listed flight in the return section with the "Economy" option also selected. If the user selects the "Seats" hyperlink, a service request may be sent to the travel distribution platform 70, and more specifically to the Air Seat service. As a result of the request or response to the Air Seat service, the testing module 150 determines if a test is triggered. The service request may include, for example, information about the selected flight, e.g., economy fare from Denver to San Francisco. In such a case, the test would be triggered, and the test conditions described above would be determined to be met.

Figure 5C:
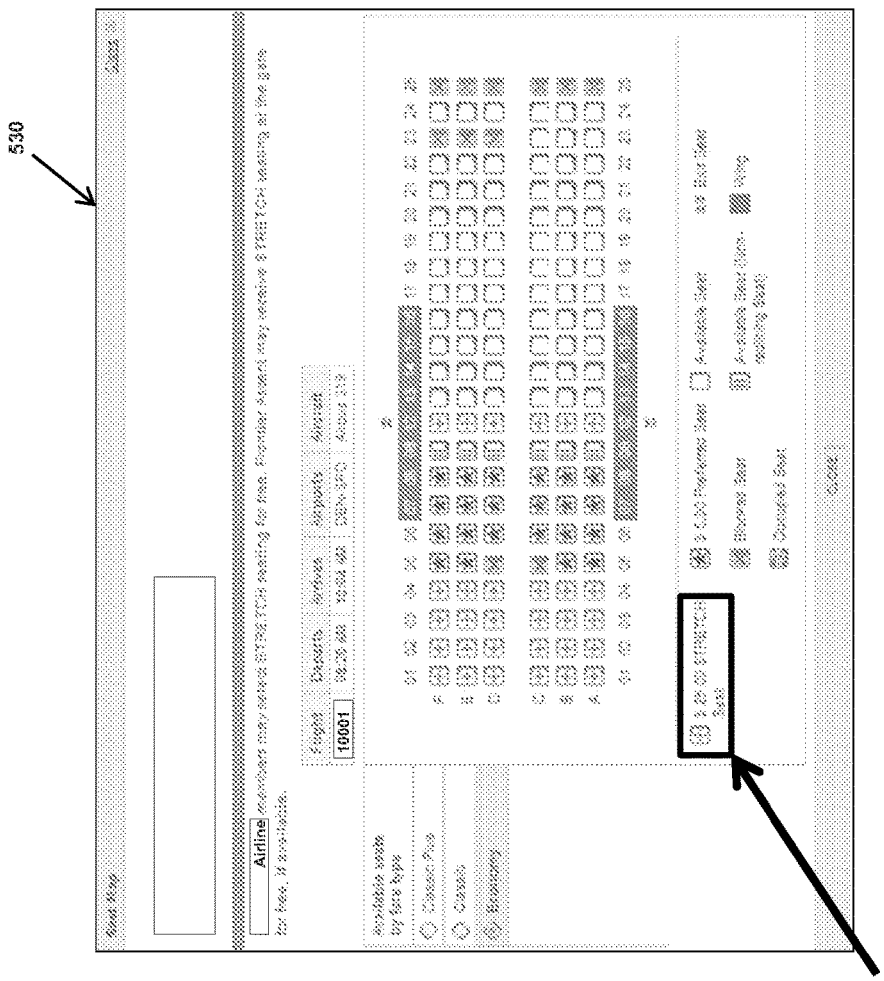
Figure 5D:
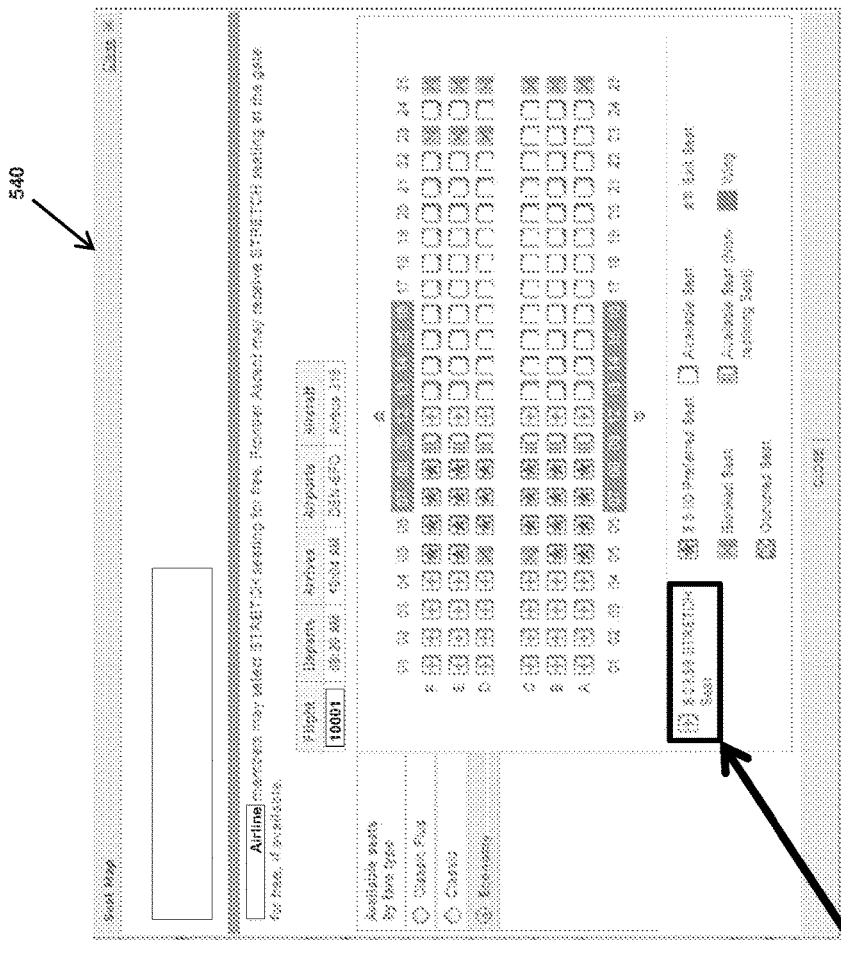

FIG. 5C and FIG. 5D show screen shots of a consumer interface where variants are executed in response to end-users who have triggered a test and met the test conditions according to exemplary embodiments. For example, FIG. 5C shows the interface presented to a first user according to an exemplary price test variant, and FIG. 5D shows the interface for a second user according to an exemplary control test variant.

For example, referring to FIG. 5C, the first user may be presented with an interface with an option for a $25.00 Stretch seat. The second user may be presented with the interface FIG. 5D with an option for a $29.99 Stretch seat option. Both users are participating in the test, but only the first user, associated with the executed price variant, is presented with a different price option. Both users, with respect to their presented interfaces, may further interact with the travel distribution platform 70, and their subsequent interactions may be recorded, such as, with respect to any conversion actions.

Figure 6:
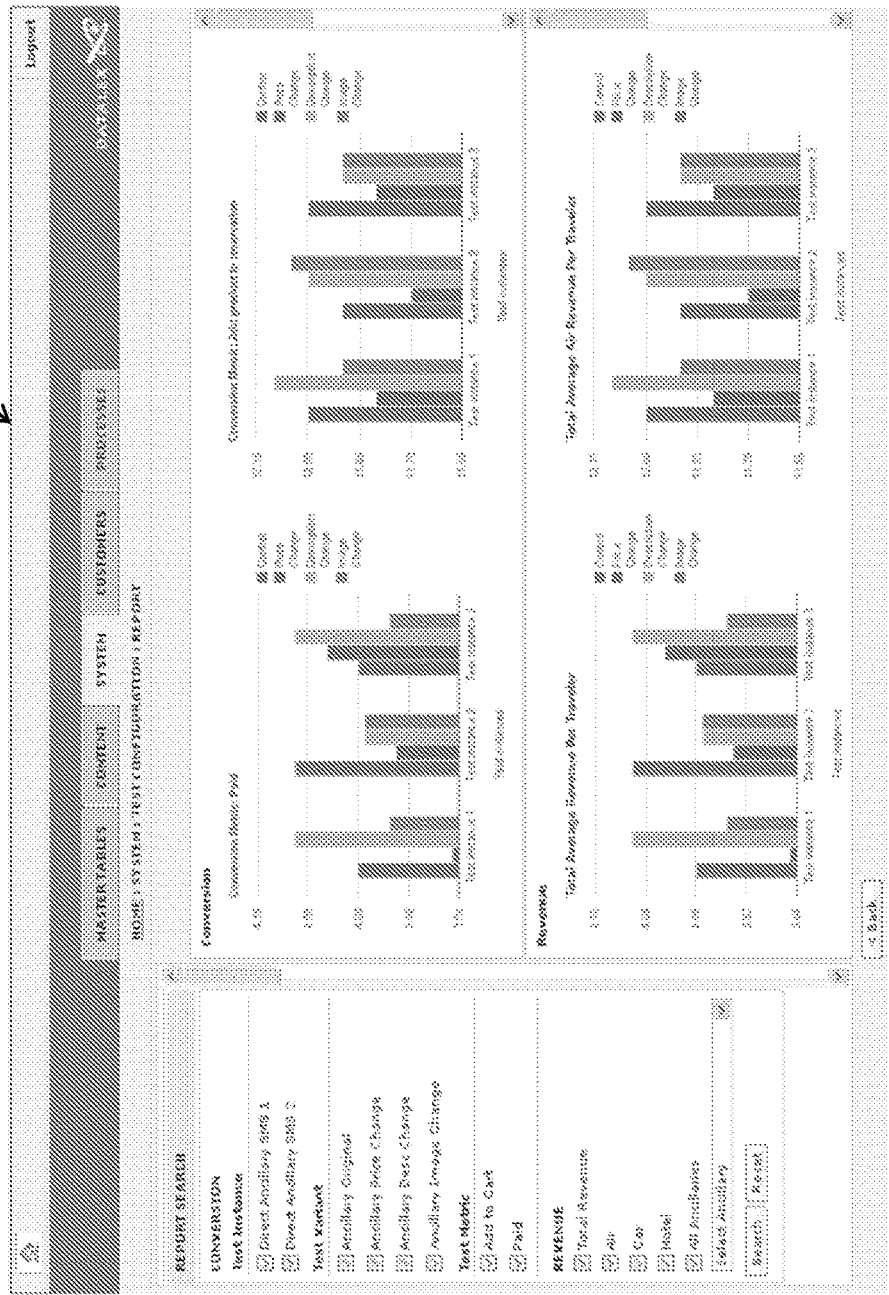
FIG. 6 is a screenshot showing a consumer interface according to an exemplary embodiment of the present invention.

In exemplary embodiments, any test or currently running and active test instance may be deactivated at any time by a client-user through the MUI. Furthermore, a client-user may at anytime use the MUI to review the test results. For example, FIG. 6 shows a sample screen shot of the MUI showing tests results according to an exemplary embodiment. In exemplary embodiments, a client-user may be presented with test results related to resulting conversions and revenue for each of previously run test instances. For example, revenue results may show the total average revenue per passenger, which may be organized as revenue outcomes by component type (AIR, CAR, HOTEL, ANCILLARY, etc) as well as by specific product (STRETCH_SEAT, MEAL_ON_BOARD etc). Conversion results may be grouped according to each conversion metric and may show the conversion rate for each test instance. In some embodiments the results for conversion metrics may be shown in the aggregate. In some exemplary embodiments, a client-user may view the tests results in real time, e.g. while a test or test instance is still on-going.

Referring to FIG. 6, the results of conversions and revenue are presented as bar graphs. It should be appreciated that the information may be presented in other forms and other visuals, such as, for example, line graphs, pie charts, and spread sheets, to name a few. The bar graphs of FIG. 6 may each be a different color so as to represent a different test variant. In some exemplary embodiments, the MUI may allow a client-user to click on one or more visuals, such as, for example, the bar graphs in order to be provided with further information with respect to the bar graph, such as, for example, further broken down detailed information represented by the selected visual.

Further, the test results data may be downloaded from the travel distribution platform 70 into a convenient format, such as, for example, an Excel file, text file, or any other suitable format.

In exemplary embodiments, may be used to adjust the prices or presentations associated with the one or more services offered by the travel distribution platform 70. For example, the testing module 150 or travel distribution platform 70 may prompt a client-user to adjust one or prices based on the results of one or more tests. The testing module 150 may generate suggested prices for products and/or services to be offered based on the test results. The testing module 150 may electronically transmit through any suitable means the generated price information to an appropriate source and/or database associated with the prices for the respective products and/or services.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A method comprising the steps of:
   (a) providing a travel distribution platform comprising:
      (i) one or more computer processors;
      (ii) one or more adapters operable by the one or more computer processors to obtain travel product data from a plurality of electronic reservation systems in response to one or more queries input to a customer interface, each of the plurality of reservation systems associated with a travel product that is different from the travel products associated with the other ones of the plurality of reservations systems;
      (iii) a cache memory that stores the obtained travel product data; and
      (iv) a testing module operable by the one or more computer processors to allow for modification of the travel product data and implement tests related to the modified travel product data;
   (b) obtaining, at the travel distribution platform, first client travel request data from a user interface of a first client device requesting information related to travel products, the user interface configured by a web server;
   (c) accessing, at the travel distribution platform, first client response data from the cache memory in response to the first client request data;
   (d) generating, by the testing module, a first set of instructions for the travel distribution platform to generate modified first client response data in accordance with testing parameters in response to the first client request data;
   (e) transmitting, from the travel distribution platform, the modified first client response data to the web server so that the web server activates the first client device to display the modified first client response data;
   (f) monitoring, by the testing module, first conversion data at the travel distribution platform related to the first client request data and the first client response data; and
   (g) storing, by the testing module, the first conversion data.

2. The method of claim 1, further comprising:
   (h) obtaining, at the travel distribution platform, second client travel request data from a user interface of a second client device requesting information related to travel products, the user interface configured by the web server;
   (i) accessing, at the travel distribution platform, second client response data from the cache memory in response to the second client request data;
   (j) generating, by the testing module, a second set of instructions for the travel distribution platform to generate modified second client response data in accordance with testing parameters in response to the second client request data;
   (k) transmitting, from the travel distribution platform, the modified second client response data to the web server so that the web server activates the second client device to display the modified second client response data;
   (l) monitoring, by the testing module, second conversion data at the travel distribution platform related to the second client request data and the second client response data;
   (m) storing, by the testing module, the second conversion data; and
   (n) generating, by the testing module, a test report using the first conversion data and the second conversion data.

3. The method of claim 1, further comprising the step of configuring, by the testing module, test configuration data to define testing parameters for testing modification of offers related to travel products.

4. The method of claim 3, wherein the test configuration data relates to one or more selected from the group consisting of: duration of the test, start/end time of the test, number of times to run the test, and test trigger.

5. The method of claim 2, wherein the first set of instructions are associated with one of a plurality of test variants, wherein each of the test variants indicates one or more modifications to be generated by the travel distribution platform.

6. The method of claim 5, wherein the second set of instructions are associated with a different test variant from the first set of instructions.

7. The method of claim 1, wherein the first conversion data comprises information related to one or more conversion actions associated with the first client device, the one or more conversion actions selected from the group consisting of: adding an item to a shopping cart, payment and clicking on a link.

8. The method of claim 1, wherein the step of monitoring first conversion data ends when a session associated with the first client device ends.

9. The method of claim 2, wherein the test report provides a comparison of one or more monitored conversion actions.

10. The method of claim 1, wherein the travel products comprise airline services.

11. A travel distribution platform comprising:
(i) one or more adapters that obtain travel product data from a plurality of electronic reservation systems in response to one or more queries input to a customer interface, each of the plurality of reservation systems associated with a travel product that is different from the travel products associated with the other ones of the plurality of reservations systems;
(ii) a cache memory that stores the obtained travel product data;
(iii) a testing module that allows for modification of the travel product data and implementation of tests related to the modified travel product data;
(iv) one or more processors;
(v) one or more memory units; and
(vi) a non-transitory computer-readable storage medium including computer-readable code that is read by the one or more processors to perform a method comprising the steps of:
  (a) obtaining, at the travel distribution platform, first client travel request data from a user interface of a first client device requesting information related to travel products, the user interface configured by a web server;
  (b) accessing, at the travel distribution platform, first client response data from the cache memory in response to the first client request data;
  (c) generating, by the testing module, a first set of instructions for the travel distribution platform to produce modified first client response data in accordance with testing parameters in response to the first client request data;
  (d) transmitting, from the travel distribution platform, the modified first client response data to the web server so that the web server activates the first client device to display the modified first client response data;
  (e) monitoring, by the testing module, first conversion data at the travel distribution platform related to the first client request data and the first client response data; and
  (f) storing, by the testing module, the first conversion data in the one or more memory units.

12. The travel distribution platform of claim 11, further comprising:
  (g) obtaining, at the travel distribution platform, second client travel request data from a user interface of a second client device requesting information related to airline services, the user interface configured by the web server;
  (h) accessing, at the travel distribution platform, second client response data from the cache memory in response to the second client request data;
  (i) generating, by the testing module, a second set of instructions for the travel distribution platform to generate modified second client response data in accordance with testing parameters in response to the second client request data;
  (j) transmitting, from the travel distribution platform, the modified second client response data to the web server so that the web server activates the second client device to display the modified second client response data;
  (k) monitoring, by the testing module, second conversion data at the travel distribution platform related to the second client request data and the second client response data;
  (l) storing, by the testing module, the second conversion data; and
  (m) generating, by the testing module, a test report using the first conversion data and the second conversion data.

13. The travel distribution platform of claim 11, further comprising the step of configuring, by the testing module, test configuration data to define testing parameters for testing modification of offers related to travel products.

14. The travel distribution platform of claim 13, wherein the test configuration data relates to one or more selected from the group consisting of: duration of the test, start/end time of the test, number of times to run the test, and test trigger.

15. The travel distribution platform of claim 12, wherein the first set of instructions are associated with one of a plurality of test variants, wherein each of the test variants indicates one or more modifications to be generated by the travel distribution platform.

16. The travel distribution platform of claim 15, wherein the second set of instructions are associated with a different test variant from the first set of instructions.

17. The travel distribution platform of claim 11, wherein the first conversion data comprises information related to one or more conversion actions associated with the first client device, the one or more conversion actions selected from the group consisting of: adding an item to a shopping cart, payment and clicking on a link.

18. The travel distribution platform of claim 11, wherein the step of monitoring first conversion data ends when a session associated with the first client device ends.

19. The travel distribution platform of claim 12, wherein the test report provides a comparison of one or more monitored conversion actions.

20. The travel distribution platform of claim 11, wherein the travel products comprise airline services.

* * * * *